United States Patent [19]

Bohrer

[11] Patent Number: 4,829,818
[45] Date of Patent: May 16, 1989

[54] FLOW SENSOR HOUSING

[75] Inventor: Philip J. Bohrer, Minneapolis, Minn.
[73] Assignee: Honeywell Inc., Minneapolis, Minn.
[21] Appl. No.: 565,308
[22] Filed: Dec. 27, 1983
[51] Int. Cl.⁴ .............................................. G01F 1/68
[52] U.S. Cl. .............................. 73/204.22; 73/204.23
[58] Field of Search ............ 73/23, 204, 273, 517 AV, 73/23.1, 204.22, 204.23; 422/97; 357/55, 69, 75; 339/17 CF; 29/572, 587–591; 264/272.17

[56] References Cited

U.S. PATENT DOCUMENTS

| | | | |
|---|---|---|---|
| 3,336,804 | 8/1967 | Poppendiek et al. | 73/204 |
| 3,665,592 | 5/1972 | Apospors | 29/588 |
| 3,764,865 | 10/1973 | Napoli et al. | 357/55 |
| 3,801,949 | 4/1974 | Larrabee | 357/55 X |
| 3,825,876 | 7/1974 | Damon et al. | 339/17 CF |
| 3,881,181 | 4/1975 | Khajezadeh | 357/69 |
| 3,931,736 | 1/1976 | Olmstead | 73/204 |
| 3,943,557 | 3/1976 | Frazee et al. | 357/75 |
| 3,981,074 | 9/1976 | Yamamoto et al. | 264/272.17 X |
| 4,188,708 | 2/1980 | Frederiksen | 29/572 |
| 4,224,565 | 9/1980 | Sosniak et al. | 324/65 R |
| 4,326,214 | 4/1982 | Trueblood | 357/74 |
| 4,343,768 | 8/1982 | Kimura | 422/97 |
| 4,406,508 | 9/1983 | Behzadi | 339/17 CF X |
| 4,471,647 | 9/1984 | Jerman et al. | 73/23.1 X |
| 4,472,239 | 9/1984 | Johnson et al. | 357/55 X |
| 4,478,077 | 10/1984 | Bohrer et al. | 73/204 |
| 4,491,377 | 1/1985 | Pfaff | 339/17 CF X |

OTHER PUBLICATIONS

K. Malin and A. Schmitt, Mass Flow Meter, IBM Technical Disclosure Bulletin, vol. 21, No. 8, Jan. 1979.
Rahnamai, H. et al. "Pyroelectric Anemometers." 1980 International Electron Devices Meeting, Washington, D.C. Dec. 8–10, 1980, pp. 680–684.

Primary Examiner—Richard L. Chiesa
Attorney, Agent, or Firm—C. G. Mersereau

[57] ABSTRACT

Disclosed is a flow sensor housing comprising a base member having a flow channel formed therein. The base member comprises means for mounting a flow sensor so that, when a flow sensor is mounted therein, air flowing through the flow channel will be sensed by the flow sensor. The base member comprises the body of a standard semiconductor package. Standard semiconductor package conductors are integral to the base member. Each conductor has first and second terminal portions. The conductors and terminal portions are positioned so that the first terminal portion of a plurality of conductors are each adapted to connect to a higher level package adapted for receiving a standard semiconductor package and so that the second terminal portion of a plurality of conductors are each adapted for electrical connection to the flow sensor.

20 Claims, 2 Drawing Sheets

FLOW SENSOR HOUSING

BACKGROUND OF THE INVENTION

The present invention relates to flow sensors and, more particularly, to flow sensor housings. The problem solved by the present invention is the lack of a practical first-level package suitable for miniature flow sensors such as on-chip sensors. Although the present invention is particularly applicable to on-chip flow sensors, it is not limited to on-chip sensors.

SUMMARY OF THE INVENTION

The present invention is a flow sensor housing comprising a base member having a flow channel formed therein. The base member comprises means for mounting a flow sensor so that, when a flow sensor is mounted therein, air flowing through the flow channel will be sensed by the flow sensor. The base member comprises the body of a standard semiconductor package. Standard semiconductor package conductors are integral to the base member. Each conductor has first and second terminal portions. The conductors and terminal portions are positioned so that the first terminal portion of a plurality of conductors are each adapted to connect to a higher level package adapted for receiving a standard semiconductor package and so that the second terminal portion of a plurality of conductors are each adapted for electrical connection to the flow sensor.

BRIEF DESCRIPTION OF THE DRAWINGS

The FIGS. 1, 2A,2B, and 3-9 illustrate alternate preferred embodiments of the present flow sensor housing invention.

DETAILED DESCRIPTION OF THE PREFERRED EMBODIMENTS

Figure 1:
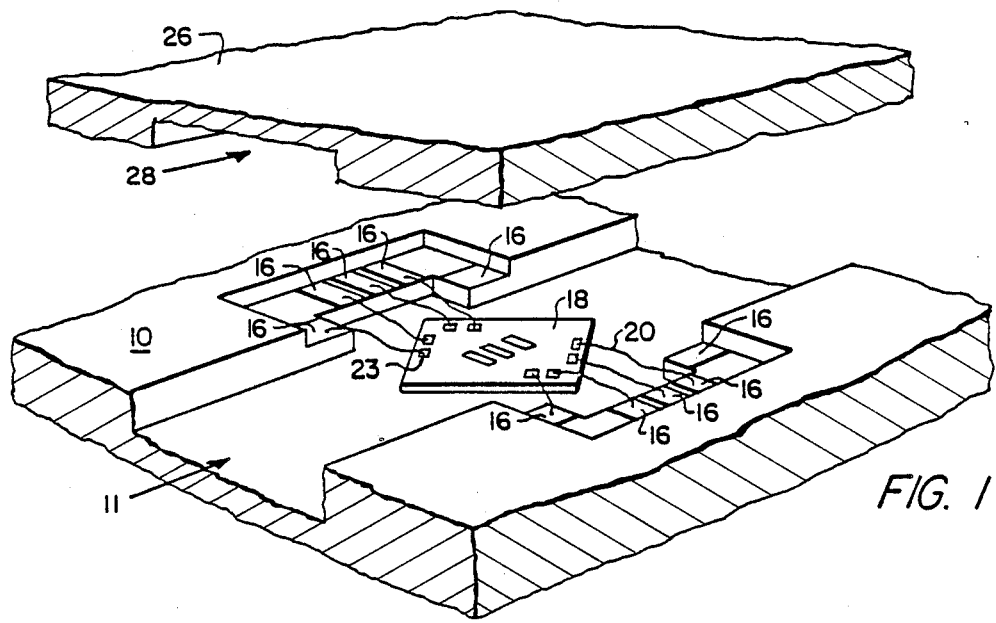

FIG. 1 illustrates a body or base member 10 of a standard semiconductor package having a flow channel 11 formed therein. Base member 10 may be fabricated of any suitable material; ceramic and plastic are examples of suitable materials. Standard semiconductor package conductors 12 (FIGS. 6-9) are integral to body or base member 10. Each conductor 12 has first terminal portions 13 and second terminal portions 16 or 22. The conductors and terminal portions are positioned so that the first terminal portion 13 of a plurality of conductors 12 are each adapted to connect to a higher level package 15 adapted for receiving a standard semiconductor package and so that the second terminal portion 16 or 22 of a plurality of conductors 12 are each adapted for electrical connection to a flow sensor 18.

Electrical connection between a flow sensor 18 mounted in the package and conductors 12 can be made by any compatible process such as wire bonding or solder bump techniques. In FIG. 1, flow sensor chip 18 is facing upward and is connected by wire bonding utilizing wires 20 connected between interface metalizations 23 on chip 18 and second terminal portions 16 integral to body or base member 10.

Figure 2A:
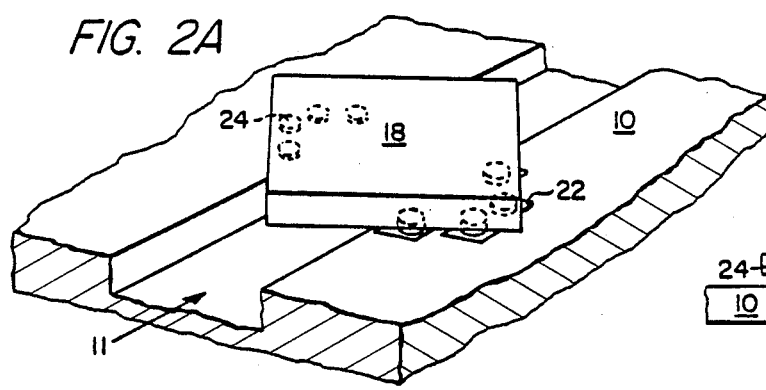
Figure 2B:
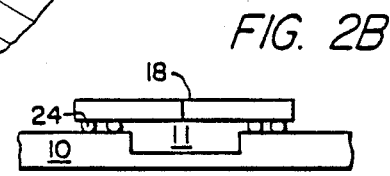

An extremely small effective duct or flow channel 11 can be practically realized by solder bump techniques which do not share the space requirement encountered with wire bonding. Pictorial and cross-sectional drawings in FIGS. 2A and 2B illustrate how electrical connections to sensor chip 18 can be made with the solder-bump technique. In the embodiment illustrated in FIGS. 2A and 2B, flow sensor chip 18 is facing downward, and solder-bumps 24 are used to connect sensor chip 18 to semiconductor package body 10. Each solderbump 24 is connected by standard reflow techniques between interface metalizations on sensor chip 18 and second terminal portions 22 integral to body 10.

The angular positioning of flow sensor chip 18 in the Figures relates to a preferred embodiment of a flow sensor employed by the assignee of the present invention. That flow sensor is typically fabricated with thin-film encapsulated sensor elements suspended over a depression in sensor chip 18. The fabrication process for such a sensor typically employs aligning the sensor elements at a nonzero axis to particular crystal structure in the semiconductor substrate, which is typically silicon. Accordingly, the sensor chips are mounted at an angle as shown in order to obtain a desired or optimum response to the flow. Optimum sensitivity is typically obtained in the preferred sensor by aligning the sensor's axis perpendicular to the stream lines of flow. Due to the silicon crystalline structure of preferred chip 18, the sensor's axis is typically at a nonzero angle, usually 45 degrees, to the edges of chip 18. This accounts for the angular positioning of the sensor chip 18 edges as illustrated in the Figures.

An additional body piece or cover 26, which may or may not also have a flow channel 28 to increase the height of flow channel 11, may be included in the present invention to complete an enclosed duct.

Figure 3:
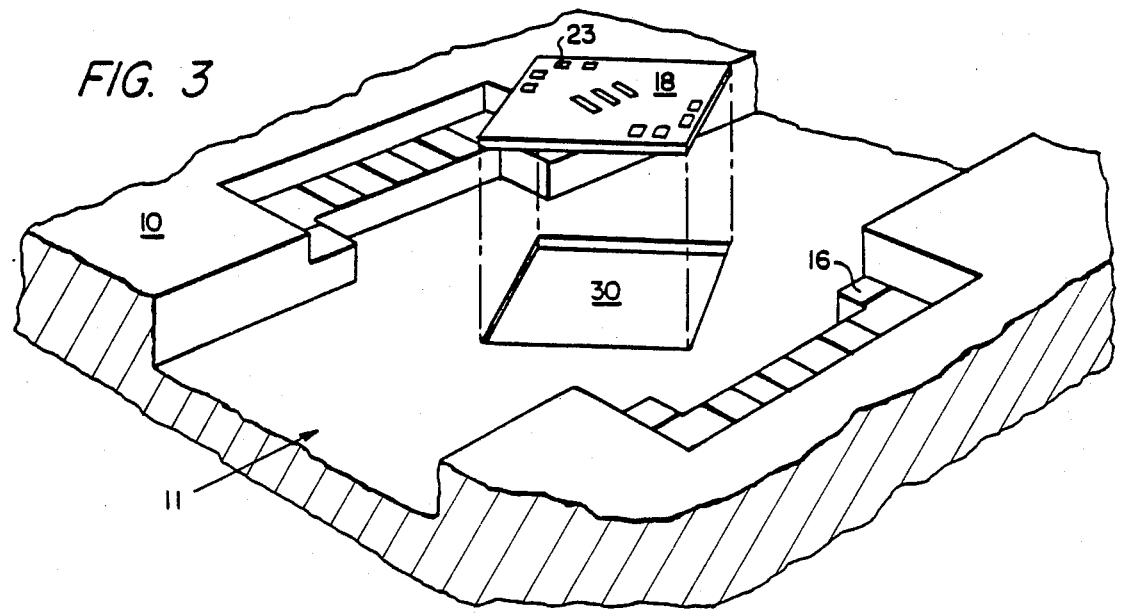

Packages compatible with the present invention may be molded from plastic and thus be made at very low unit cost. As depicted in FIG. 3, an appropriate cavity 30 may be included in the mold to facilitate automatic placement of sensors or sensor chips such as 18, thus assuring proper orientation for desired or optimum response to flow. Further, placing a sensor chip 18 into a cavity 30 as illustrated in FIG. 3 permits the surface of a sensor chip to be flush with the flow surface of flow channel 11, thus helping to eliminate perturbations in flow across the sensor.

Figure 4:
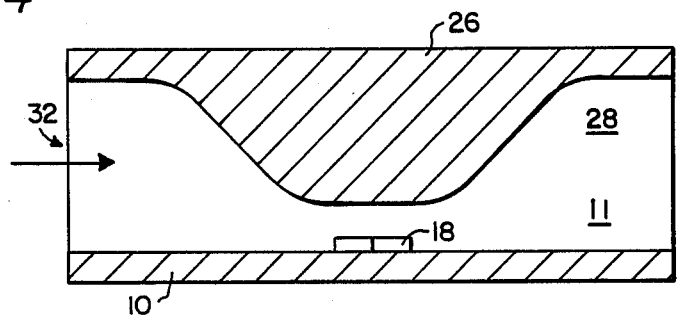

The height and width of duct or flow channels 11 and 28 are easily controlled and reproduced in the present invention. The cross-section of duct or flow channels 11 and 28 may be rectangular as suggested by FIGS. 1-3 or may be of other cross-sectional configurations such as circular or ovular. The dimensions of channel 11 and/or channel 28 can be adjusted as a means of scaling the sensor response for optimization to specific applications, that is, for providing optimized response for different full scale ranges of flow rate. Duct or channels 11 and 28 may also comprise nonuniform dimensions so that the cross-sectional area varies along the package length. In this manner, flow velocity across the sensor can be scaled. For example, as illustrated in FIG. 4, a smaller cross-sectional area at sensor 18 than at inlet 32 will increase the velocity sensed for low flow applications, thus increasing the effective sensitivity of the sensor.

Figure 5:
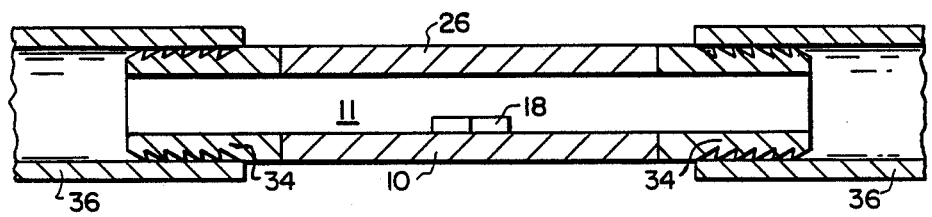
Figure 6:
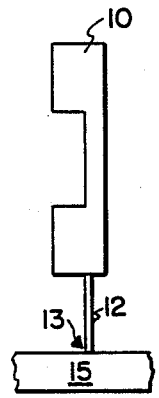
Figure 7:
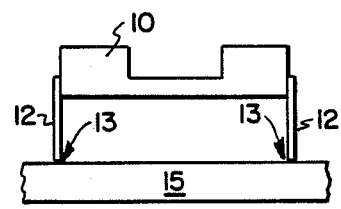
Figure 8:
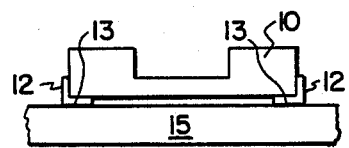

The present invention is not limited to ducts or channels 11 which are open at the ends of the standard semiconductor package. As illustrated in FIG. 5, air-tight couplers 34 may be used to connect flow channel 11 to air or gas lines or tubes 36. Such a configuration is desirable for small flow or line flow applications where leaks are to be avoided.

Figure 9:
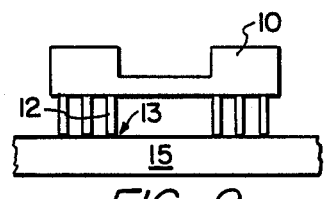

Virtually any standard package compatible with incorporating a flow channel therein may be used as part of the present invention. Examples include dual-in-line packages (DIPs) (FIG. 7), single-in-line packages (SIPs) (FIG. 6), leadless chip carriers (FIG. 8), as well as standard pin grid or pin array packages (FIG. 9).

The advantages of the present invention over prior art flow sensor housings are many. A primary advantage is that standard semiconductor packages comprise conductors 12 integral to base member 10, and these conductors 12 are positioned so that they are readily connectable to a higher level package 15 of which there are many choices. For example, standard semiconductor packages are directly compatible with many sockets adapted for receiving standard semiconductor packages as well as printed circuit boards, thick film ceramic substrates and similar higher level packages which may be standard or fabricated for particular applications.

Further advantages of the present invention include the ability to use automatic insertion equipment for placing flow sensor housings incorporating the present invention into printed circuit boards and the like. Such equipment is readily available for standard semiconductor packages and, therefore, is readily available for handling the present flow sensor housings.

In addition, the standard semiconductor package within the present invention enables use of standard spacing on printed circuit boards, thus eliminating the need for special design rules for mounting housed flow sensors.

The standard semiconductor packages forming a portion of the present invention are also readily available inexpensively in large volume and, therefore, eliminate the high cost of special tooling necessary for alternate sensor housings.

The present invention is to be limited only in accordance with the scope of the appended claims, since others skilled in the art may devise other embodiments still within the limits of the claims. For example, standard semiconductor packages other than those examples specifically disclosed, whether existing now or in the future, may form a part of the present invention.

The embodiments of the invention in which an exclusive property or right is claimed are defined as follows:

1. A flow sensor housing comprising:
   a base member having a flow channel formed therein, the base member comprising means for mounting a flow sensor so that, when a flow sensor is mounted therein, air flowing through the flow channel will be sensed by the flow sensor, the base member comprising the body of a standard semiconductor package; and
   standard semiconductor package conductors integral to the base member, each conductor having first and second terminal portions, the conductors and terminal portions being positioned so that the first terminal portion of a plurality of conductors are each adapted to connect to a higher level package adapted for receiving a standard semiconductor package and so that the second terminal portion of a plurality of conductors are each adapted for electrical connection to the flow sensor.

2. The apparatus of claim 1 wherein the standard semiconductor package comprises a dual-in-line package.

3. The apparatus of claim 2 wherein the means for mounting the flow sensor comprises means for electrically connecting the second terminal portion of the conductors to the flow sensor by wire bonding.

4. The apparatus of claim 2 wherein the means for mounting the flow sensor comprises means for electrically connecting the second terminal portion of the conductors to the flow sensor by solderbump techniques.

5. The apparatus of claim 1 wherein the standard semiconductor package comprises a pin array package.

6. The apparatus of claim 5 wherein the means for mounting the flow sensor comprises means for electrically connecting the second terminal portion of the conductors to the flow sensor by wire bonding.

7. The apparatus of claim 5 wherein the means for mounting the flow sensor comprises means for electrically connecting the second terminal portion of the conductors to the flow sensor by solderbump techniques.

8. The apparatus of claim 1 wherein the standard semiconductor package comprises a single-in-line package.

9. The apparatus of claim 8 wherein the means for mounting the flow sensor comprises means for electrically connecting the second terminal portion of the conductors to the flow sensor by wire bonding.

10. The apparatus of claim 8 wherein the means for mounting the flow sensor comprises means for electrically connecting the second terminal portion of the conductors to the flow sensor by solderbump techniques.

11. The apparatus of claim 1 wherein the standard semiconductor package comprises a leadless chip carrier.

12. The apparatus of claim 11 wherein the means for mounting the flow sensor comprises means for electrically connecting the second terminal portion of the conductors to the flow sensor by wire bonding.

13. The apparatus of claim 11 wherein the means for mounting the flow sensor comprises means for electrically connecting the second terminal portion of the conductors to the flow sensor by solderbump techniques.

14. The apparatus of claim 1 wherein the means for mounting the flow sensor comprises means for orienting the flow sensor for a desired response to the flow.

15. The apparatus of claim 14 wherein the means for mounting the flow sensor comprises terminal portions adapted for solderbump connection.

16. The apparatus of claim 14 wherein the means for mounting the flow sensor comprises a cavity in the base member for receiving and positioning at least a portion of the flow sensor.

17. The apparatus of claim 1 wherein the means for mounting the flow sensor comprises means for orienting the flow sensor for optimum response to the flow.

18. The apparatus of claim 17 wherein the means for mounting the flow sensor comprises terminal portions adapted for solderbump connection.

19. The apparatus of claim 17 wherein the means for mounting the flow sensor comprises a cavity in the base member for receiving and positioning at least a portion of the flow sensor.

20. The apparatus of claim 1 wherein the flow channel comprises nonuniform dimensions for enhancing the velocity of the flow over the flow sensor.

* * * * *